US012380221B2

(12) United States Patent
Nunes et al.

(10) Patent No.: US 12,380,221 B2
(45) Date of Patent: *Aug. 5, 2025

(54) SYSTEMS AND METHODS FOR AN AT-RISK SYSTEM IDENTIFICATION VIA ANALYSIS OF ONLINE HACKER COMMUNITY DISCUSSIONS

(71) Applicant: Arizona Board of Regents on Behalf of Arizona State University, Tempe, AZ (US)

(72) Inventors: Eric Nunes, Tempe, AZ (US); Jana Shakarian, Tempe, AZ (US); Paulo Shakarian, Tempe, AZ (US); Mohammed Almukaynizi, Tempe, AZ (US); Harshdeep Singh, Tempe, AZ (US); Gerardo Simari, Tempe, AZ (US); Anant Sharma, Tempe, AZ (US)

(73) Assignees: Arizona Board of Regents on Behalf of Arizona State University, Tempe, AZ (US); Securin, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,138

(22) Filed: Jun. 28, 2023

(65) Prior Publication Data

US 2024/0176890 A1 May 30, 2024

Related U.S. Application Data

(63) Continuation of application No. 16/875,540, filed on May 15, 2020, now Pat. No. 11,693,972.
(60) Provisional application No. 62/848,022, filed on May 15, 2019.

(51) Int. Cl.
| | | |
|---|---|---|
| G06F 21/57 | (2013.01) | |
| G06F 16/951 | (2019.01) | |
| G06F 16/9536 | (2019.01) | |
| G06N 20/00 | (2019.01) | |

(52) U.S. Cl.
CPC .......... G06F 21/577 (2013.01); G06F 16/951 (2019.01); G06F 16/9536 (2019.01); G06N 20/00 (2019.01); G06F 2221/034 (2013.01)

(58) Field of Classification Search
CPC .. G06F 21/577; G06F 16/951; G06F 16/9536; G06N 20/00
See application file for complete search history.

(56) References Cited

U.S. PATENT DOCUMENTS

| | | |
|---|---|---|
| 10,176,438 B2 | 1/2019 | Shakarian et al. |
| 10,313,385 B2 | 6/2019 | Shakarian et al. |
| 10,437,945 B2 | 10/2019 | Shakarian et al. |
| 11,693,972 B2* | 7/2023 | Nunes .................. G06F 21/577 726/25 |
| 2019/0347327 A1 | 11/2019 | Patil et al. |
| 2019/0349393 A1 | 11/2019 | Nunes et al. |

(Continued)

OTHER PUBLICATIONS

U.S. Appl. No. 16/548,329, filed Aug. 22, 2019, Tavabi et al.

(Continued)

*Primary Examiner* — Oleg Korsak
(74) *Attorney, Agent, or Firm* — Polsinelli PC

(57) ABSTRACT

Various embodiments of systems and methods for an at-risk system identification via analysis of discussions from various online hacker communities are disclosed herein.

8 Claims, 11 Drawing Sheets

(56) References Cited

U.S. PATENT DOCUMENTS

2020/0036743 A1 1/2020 Almukaynizi et al.
2020/0356675 A1 11/2020 Shakarian et al.
2020/0410028 A1 12/2020 Shaabani et al.

OTHER PUBLICATIONS

U.S. Appl. No. 16/653,899, filed Oct. 15, 2019, Sarkar et al.
Lloyd, Foundations of logic programming. Springer Science & Business Media, 2012.
Rahwan, et al., Argumentation in artificial intelligence, vol. 47. Springer, 2009.
Robertson, et al., Darkweb Cyber Threat Intelligence Mining. Cambridge University Press, 2017.
Abbasi, et al., Descriptive analytics: Examining expert hackers in web forums. In Intelligence and Security Informatics Conference (JISIC), 2014 IEEE Joint, pp. 56-63. IEEE, 2014.
Allodi, et al., Comparing vulnerability severity and exploits using case-control studies. ACM Transactions on Information and System Security (TISSEC), 17(1):1, 2014.
Almukaynizi, et al., Predicting cyber threats through the dynamics of user connectivity in darkweb and deepweb forums. In ACM Computational Social Science. ACM, 2017.
Almukaynizi, et al., Proactive identification of exploits in the wild through vulnerability mentions online. In 2017 International Conference on Cyber Conflict (CyCon U.S.), pp. 82-88, Nov. 2017.
Benjamin, et al., Exploring threats and vulnerabilities in hacker web: Forums, irc and carding shops. In Intelligence and Security Informatics (ISI), 2015 IEEE International Conference on, pp. 85-90. IEEE, 2015.
Bullough, et al., Predicting exploitation of disclosed software vulnerabilities using open-source data. In Proceedings of the 2015 ACM International Workshop on International Workshop on Security and Privacy Analytics. ACM, 2017.
CPE. Official common platform enumeration dictionary. https://nvd.nist.gov/cpe.cfm, Last Accessed: Feb. 2018.
CVE. Common vulnerabilities and exposures: The standard for information security vulnerability names. http://cve.mitre.org/, Last Accessed: Feb. 2018.
CVSS. Common vulnerability scoring system. https://www.first.org/cvss, Last Accessed: Feb. 2018.
Dingledine, et al., Tor: The second-generation onion router. In Proceedings of the 13th Conference on USENIX Security Symposium—vol. 13, SSYM'04, pp. 21-21, 2004.
Dung, On the acceptability of arguments and its fundamental role in nonmonotonic reasoning, logic programming and n-person games. Artificial intelligence, 77(2):321-357, 1995.
Garcia, et al., Defeasible logic programming: An argumentative approach. Theory and practice of logic programming, 4 (1+ 2):95-138, 2004.
Ghaffarian, et al., Software vulnerability analysis and discovery using machine-learning and data-mining techniques: A survey. ACM Computing Surveys (CSUR), 50(4):56, 2017.
Google. Google cloud translation api documentation. https://cloud.google.com/translate/docs/, Last Accessed: Feb. 2018.
Lee, et al., Engineering doc2vec for automatic classification of product descriptions on o2o applications. Electronic Commerce Research, pp. 1-24, 2017.
Macdonald, et al., Identifying digital threats in a hacker web forum. In Advances in Social Networks Analysis and Mining (ASONAM), 2015 IEEE/ACM International Conference on, pp. 926-933. IEEE, 2015.
Marin, et al., Product offerings in malicious hacker markets. In Intelligence and Security Informatics (ISI), 2016 IEEE Conference on, pp. 187-189. IEEE, 2016.
Marin, et al., Mining key-hackers on darkweb forums. In International Conference on Data Intelligence and Security (ICDIS), 2018. IEEE, 2018.
Neuhaus, et al., Predicting vulnerable software components. In Proceedings of the 14th ACM conference on Computer and communications security, pp. 529-540. ACM, 2007.
NIST. National vulnerability database. https://nvd.nist.gov/, Last Accessed: Feb. 2018.
Nunes, et al., Darknet and deepnet mining for proactive cybersecurity threat intelligence. In Proceeding of ISI 2016, pp. 7-12. IEEE, 2016.
Nunes, et al., At-risk system identification via analysis of discussions on the darkweb, 2018 APWG Symposium on Electronic Crime Research (eCrime), IEEE, 2018.
Nunes, et al., Argumentation models for cyber attribution. In Advances in Social Networks Analysis and Mining (ASONAM), 2016 IEEE/ACM International Conference on, pp. 837-844. IEEE, 2016.
Portnoff, et al., Tools for automated analysis of cybercriminal markets. In Proceedings of the 26th International Conference on World Wide Web, pp. 657-666. International World Wide Web Conferences Steering Committee, 2017.
Sabottke, et al., Vulnerability disclosure in the age of social media: exploiting twitter for predicting real-world exploits. In 24th USENIX Security Symposium (USENIX Security 15), pp. 1041-1056, 2015.
Scandariato, et al., Predicting vulnerable software components via text mining. IEEE Transactions on Software Engineering, 40(10):993-Scandariato, et al., Predicting vulnerable software components via text mining. IEEE Transactions on Software Engineering, 40(10):993-1006, 2014.1006, 2014.
Shakarian, et al., Exploring malicious hacker forums. In Cyber Deception, pp. 259-282. Springer, 2016.
Shakarian, et al., Cyber attribution: An argumentation-based approach. In Cyber Warfare, pp. 151-171. Springer, 2015.
Stolzenburg, et al., Computing generalized specificity. Journal of Applied Non-Classical Logics, 13(1):87-113, 2003.
Trieu, et al., News classification from social media using twitter-based doc2vec model and automatic query expansion. In Proceedings of the Eighth International Symposium on Information and Communication Technology, pp. 460-467. ACM, 2017.
Walden, et al., Predicting vulnerable components: Software metrics vs text mining. In Software Reliability Engineering (ISSRE), 2014 IEEE 25th International Symposium on, pp. 23-33. IEEE, 2014.
Zhang, et al., An empirical study on using the national vulnerability database to predict software vulnerabilities. In International Conference on Database and Expert Systems Applications, pp. 217-231. Springer, 2011.
Tavabi et al. (DarkEmbed: Exploit Prediction with Neural Language Models, IAAI-18, 2018-04-27, 10 pages (2018).
Deb et al., Predicting Cyber-Events by Leveraging Hacker Sentiment, MDPI, published Nov. 15, 2018, 18 pages (2018).
Samtani et al., Exploring Emerging Hacker Assets and Key Hackers for Proactive Cyber Threat Intelligence, Journal of Management Information Systems, 34:4, pp. 1023-1053, published online Jan. 2, 2018 (2018).

* cited by examiner $$\Theta: \quad \theta_1 = \quad \text{posted}(post_1, webID_1)$$
$$\theta_2 = \quad \text{posted}(post_1, userID_1)$$
$$\theta_3 = \quad \text{parent}(o, microsoft)$$
$$\theta_4 = \quad \text{parent}(apple, safari)$$
$$\theta_5 = \quad \text{user\_preference}(userID_1, apple)$$
$$\theta_6 = \quad \text{previously\_seen}(webID_1, o)$$

$$\Omega: \quad \omega_1 = \quad \neg \text{at\_risk}(post_1, sandisk) \leftarrow$$
$$\text{at\_risk}(post_1, o),$$
$$\neg \text{parent}(o, sandisk)$$
$$\omega_2 = \quad \neg \text{at\_risk}(post_1, internet\_explorer) \leftarrow$$
$$\text{at\_risk}(post_1, apple),$$
$$\neg \text{parent}(apple, internet\_explorer)$$

$$\Delta: \quad \delta_1 = \quad \text{at\_risk}(post_1, microsoft) \prec$$
$$\text{at\_risk}(post_1, o),$$
$$\text{parent}(o, microsoft)$$
$$\delta_2 = \quad \text{at\_risk}(post_1, safari) \prec$$
$$\text{at\_risk}(post_1, apple),$$
$$\text{parent}(apple, safari)$$
$$\delta_3 = \quad \text{at\_risk}(post_1, apple) \prec$$
$$\text{user\_preference}(userID_1, apple)$$
$$\delta_4 = \quad \text{at\_risk}(post_1, o) \prec$$
$$\text{previously\_seen}(webID_1, o)$$

*FIG. 4*

$(\mathcal{A}_1, \text{at\_risk}(post_1, microsoft))$    $\mathcal{A}_1 = \{\delta_1, \delta_4, \theta_3\}$
$(\mathcal{A}_2, \text{at\_risk}(post_1, safari))$    $\mathcal{A}_2 = \{\delta_2, \delta_3, \theta_4\}$
$(\mathcal{A}_3, \text{at\_risk}(post_1, apple))$    $\mathcal{A}_3 = \{\delta_3, \theta_5\}$
$(\mathcal{A}_4, \text{at\_risk}(post_1, o))$    $\mathcal{A}_4 = \{\delta_4, \theta_6\}$

*FIG. 5*

$$\Theta: \quad \theta_1 = \text{posted}(\mathcal{D}, \mathcal{W})$$
$$\theta_2 = \text{posted}(\mathcal{D}, \mathcal{U})$$

*FIG. 6*

$$\Delta : \quad \delta_1 = \quad \begin{array}{l} \text{For } s \in \mathcal{S}_w: \\ \text{at\_risk}(\mathcal{D}, s) \prec \text{previously\_seen}(\mathcal{W}, s). \\ \text{For } s \in \mathcal{S}_u: \\ \delta_2 = \quad \text{at\_risk}(\mathcal{D}, s) \prec \text{user\_preference}(\mathcal{U}, s). \end{array}$$

*FIG. 7*

$$\Theta: \quad \theta_1 = \quad \begin{array}{l} \text{For } s \in S_p: \\ \text{at\_risk}(\mathcal{D}, s) \end{array}$$

$$\Omega: \quad \omega_1 = \quad \begin{array}{l} \text{For } s \in S_p: \\ \neg\, \text{at\_risk}(\mathcal{D}, v_i) \leftarrow \text{at\_risk}(\mathcal{D}, s), \\ \qquad\qquad\qquad \neg\text{parent}(s, v_i) \end{array}$$

$$\Delta: \quad \begin{array}{l} \delta_1 = \\ \\ \delta_2 = \\ \\ \delta_3 = \end{array} \quad \begin{array}{l} \text{For } v \in V_w: \\ \text{at\_risk}(\mathcal{D}, v) \prec \text{previously\_seen}(\mathcal{W}, v). \\ \text{For } v \in V_u: \\ \text{at\_risk}(\mathcal{D}, v) \prec \text{user\_preference}(\mathcal{U}, v). \\ \text{For } s \in S_p: \\ \text{at\_risk}(\mathcal{D}, v_i) \leftarrow \text{at\_risk}(\mathcal{D}, s), \\ \qquad\qquad\qquad \text{parent}(s, v_i) \end{array}$$

*FIG. 8*

$$\Theta: \quad \theta_1 = \quad \begin{array}{l} \text{For } v \in V_p: \\ \text{at\_risk}(\mathcal{D}, v) \end{array}$$

$$\Omega: \quad \omega_1 = \quad \begin{array}{l} \text{For } v \in V_p: \\ \neg \text{ at\_risk}(\mathcal{D}, p_i) \leftarrow \text{at\_risk}(\mathcal{D}, v), \\ \qquad \neg \text{parent}(v, p_i) \end{array}$$

$$\Delta: \quad \begin{array}{l} \delta_1 = \\ \\ \delta_2 = \\ \\ \delta_3 = \end{array} \quad \begin{array}{l} \text{For } p \in \mathcal{P}_w: \\ \text{at\_risk}(\mathcal{D}, p) \prec \text{previously\_seen}(\mathcal{W}, p). \\ \text{For } p \in \mathcal{P}_w: \\ \text{at\_risk}(\mathcal{D}, p) \prec \text{user\_preference}(\mathcal{U}, p). \\ \text{For } v \in V_p: \\ \text{at\_risk}(\mathcal{D}, p_i) \leftarrow \text{at\_risk}(\mathcal{D}, v), \\ \qquad \text{parent}(v, p_i) \end{array}$$

*FIG. 9*

SYSTEMS AND METHODS FOR AN AT-RISK SYSTEM IDENTIFICATION VIA ANALYSIS OF ONLINE HACKER COMMUNITY DISCUSSIONS

CROSS REFERENCE TO RELATED APPLICATIONS

The present application is a continuation patent application of U.S. non-provisional application Ser. No. 16/875,540; filed May 15, 2023, the non-provisional application claims the benefit to U.S. provisional application Ser. No. 62/848,022 filed on May 15, 2019 which are incorporated by reference in their entirety.

FIELD

The present disclosure generally relates to at-risk system identification, and in particular to systems and methods for identifying at-risk systems via analysis of discussions on the darkweb.

BACKGROUND

Adequate assessment of threats to systems is a central aspect of a mature security policy in that identifying systems that are at-risk can help defend against potential cyber attacks. Currently, organizations rely on the rating system (CVSS score) provided by The National Institute of Science and Technology, which maintains a comprehensive list of publicly disclosed vulnerabilities in the National Vulnerability Database (NVD), to identify if their systems are at risk. Case studies have shown poor correlation between the CVSS score and the likelihood that vulnerability on a system will be targeted by hackers. Hence, organizations are constantly looking for ways to proactively identify if their vulnerable systems are of interest to hackers.

Threat intelligence from online hacker communities such as the deepweb and darkweb (D2web) has been leveraged to predict whether or not a vulnerability mention on D2web will be exploited. This method only considers hacker discussions that have a CVE number mentioned in them—a limitation of this approach is therefore that discussions with no vulnerability identifiers (CVE) that are of interest to threat actors are not taken into account.

Open source intelligence has been used previously to identify and predict vulnerabilities that are likely to be exploited to determine which systems are at risk. Some methods explore the possibility of predicting the likelihood that software has a vulnerability not yet discovered using the national vulnerability database (NVD). These methods show that NVD has a poor prediction capability due to limited amount of information available. On the other hand, other methods look to predict if a real world exploit is available based on vulnerabilities disclosed from Twitter data. Some of these methods report high accuracies of 90% using a resampled, balanced, and temporal mixed dataset not reflective of real world scenarios.

Identifying threats to critical infrastructure by analyzing interactions on hacker forums has also been explored. In this method, keyword based queries are relied on to identify such threats from hacker interactions. This method looks to extract products mentioned in the description of the item that is being offered but does not attempt to identify targeted systems not explicitly stated in the forum discussions.

More recently, researchers have shown increased interest on gathering threat intelligence from D2web to pro-actively identify digital threats and study hacker communities to gather insights. Researchers have focused on building infrastructure to gather threat information from markets (regarding goods and services sold) and forums (discussions regarding exploits) studying the different product categories offered in darkweb markets—creating a labeled dataset, analyzing hacker forums and carding shops to identify potential threats, identify expert hackers to determine their specialties, identify key hackers based on posted content, their network and since when they are active in the forum. For vulnerability research, studies look to leverage vulnerability mentions in the D2web to predict the likelihood of exploitation using a combination of machine learning and social network techniques. These techniques rely on the mentions of CVE numbers to identify likely targeted systems (which is a small fraction of vulnerabilities), not taking into account discussions where a CVE number is not mentioned. On the other hand, these techniques do not look to identify the at-risk systems without having a CVE number.

Another method of identifying targeted softwares with vulnerabilities deals with analyzing the software itself in order to determine which component of the software is most likely to contain a vulnerability. Attempts at mapping past vulnerabilities to vulnerable software components have found that components with function calls and import statements are more likely to have a vulnerability. A similar method in which text mining was used to forecast whether a particular software component contains vulnerabilities. Text mining methods create a count dictionary of terms used in the software, which are used as features to identify vulnerabilities. These methods suffer from the issue of not knowing which vulnerabilities might be of interest to hackers.

It is with these observations in mind, among others, that various aspects of the present disclosure were conceived and developed.

BRIEF DESCRIPTION OF THE DRAWINGS

FIG. 4 shows a ground augmentation framework demonstrating constructs derived from the D2Web data, according to aspects of the present disclosure.

FIG. 5 shows an example of ground arguments based on the ground argumentation framework shown in FIG. 4, according to aspects of the present disclosure.

FIG. 6 shows an example of facts defined for each test discussion used in an implementation of the reasoning framework, according to aspects of the present disclosure.

FIG. 7 shows an example of defeasible rules for platform identification, according to aspects of the present disclosure.

FIG. 8 shows an example of defeasible rules for vendor identification, according to aspects of the present disclosure.

FIG. 9 shows an example of defeasible rules for product identification, according to aspects of the present disclosure.

Corresponding reference characters indicate corresponding elements among the view of the drawings. The headings used in the figures do not limit the scope of the claims.

DETAILED DESCRIPTION

Figure 1:
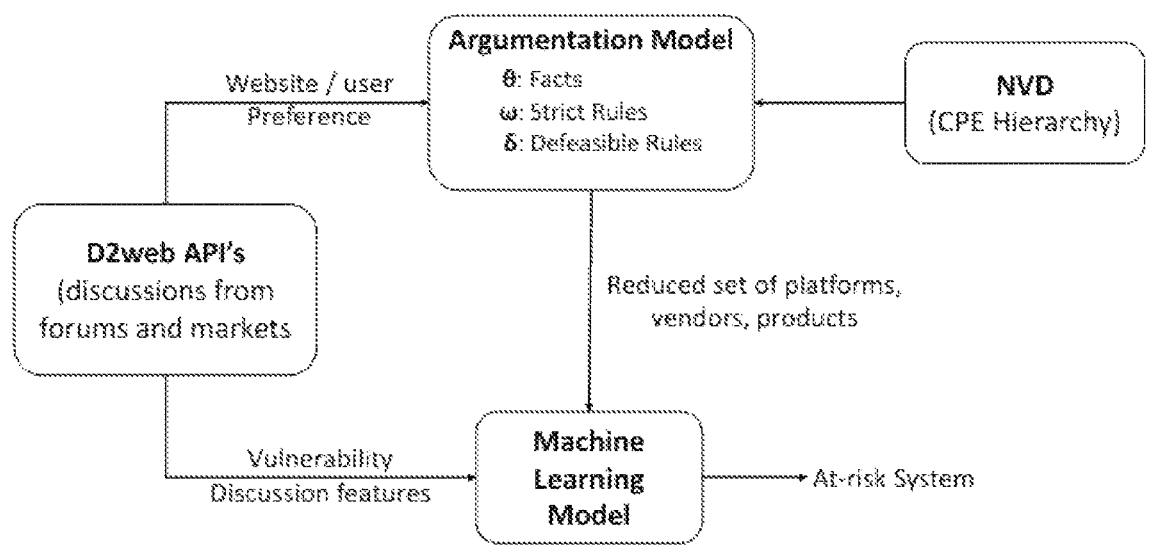
FIG. 1 is a diagram of a reasoning framework implemented by a risk identification system, according to aspects of the present disclosure.

Aspects of the present disclosure relate to a computer-implemented system for leveraging threat intelligence gathered from various online hacker communities that can include but is not limited to deepweb and darkweb (D2web) markets and forums but also other online hacker communities (i.e. those using social media or "surface web" sites) to identify the systems that might be of interest to threat actors, referred to herein as a risk identification system. Systems are identified based on the structured naming scheme Common Platform Enumeration (CPE [7]). The first three system components of the CPE naming scheme and examples of each are shown in Table I.

TABLE 1

System components and examples

| Components | Explanation and Examples |
| --- | --- |
| Platform | Can be either hardware (h), operating system (o), or application (a) based on what the vulnerability exploits. |
| Vendor | The owner of the vulnerable product. Examples include Google, Microsoft, The Mozilla Foundation, and the University of Oxford. |
| Product | The product that is vulnerable. Examples include Internet Explorer, Java Runtime Environment, Adobe Reader, and Windows 2000. |

The risk identification system leverages threat intelligence (hacker discussions) and makes a decision regarding at-risk systems, at the same time providing arguments as to why a particular decision was made. The risk identification system explores multiple competing hypotheses, such as multiple platforms, vendors, or products based on the discussions for and against a particular at-risk component. The resulting system is a hybrid that combines DeLP with machine learning classifiers.

In this context, identifying at-risk systems is framed as a multi-label classification problem, and several machine learning approaches are applied to compare their performance. A large number of possible label choices for vendors and products with less representation in training account for the majority of the misclassified samples.

To address misclassification, a hybrid reasoning framework is proposed that combines machine learning techniques with defeasible argumentation to reduce the set of possible labels for each system component. The reasoning framework can provide arguments supporting the decisions, indicating why a particular system was identified over others thus supporting a security analyst in better understanding the result.

Darkweb (D2web) Websites

Darkweb refers to the portion of the internet that is not indexed by search engines and hence cannot be accessed by standard browsers. Specialized browsers like "The Onion Router" (Tor) are required to access these websites. Widely used for underground communication, Tor is free software dedicated to protecting the privacy of its users by obscuring traffic analysis. The network traffic in Tor is guided through a number of volunteer-operated servers called "nodes". Each node of the network encrypts the information it blindly passes on neither registering where the traffic came from nor where it is headed, disallowing any tracking. In this disclosure, information is retrieved from both marketplaces, where users advertise to sell information regarding vulnerabilities or exploits targeting the vulnerabilities, and forums that provide discussions on discovered vulnerabilities among others.

Users advertise and sell their products and services (referred to as items) on marketplaces. D2web marketplaces provide a new avenue to gather information about the cyber threat landscape, in particular exploits targeting vulnerabilities or hacking services provided by vendors at a particular price. These marketplaces also sell goods and services relating to drugs, pornography, weapons, and software services—these should be filtered out for use by the risk identification system.

Forums are user-oriented platforms where like-minded individuals have discussions on topics of interest, regardless of their geophysical location. Administrators set up D2web forums with communication safety for their members in mind. While structure and organization of D2web-hosted forums might be very similar to more familiar web-forums, the topics and concerns of the users vary distinctly. Forums addressing malicious hackers feature discussions on programming, hacking, and cyber-security with newly discovered vulnerabilities as well as zero-days (vulnerabilities not publicly disclosed yet). Threads are dedicated to security concerns like privacy and online-safety—such topics plug back into and determine the structures and usage of the platforms.

Vulnerability Related Terms

Vulnerability is a flaw in a system (software/hardware) that makes the system vulnerable to attacks compromising the confidentiality, integrity or availability of the system to cause harm.

Common vulnerability enumeration (CVE) is a unique identifier assigned to a system vulnerability reported to NIST. NIST maintains a database of all the vulnerabilities publicly available in the National Vulnerability Database (NVD). Predicting exploitability of a CVE is an important problem and recent work leveraging darkweb data has shown good performance in achieving that goal. However, these techniques rely on direct mentions of CVE's while a very small portion of hacker discussions in the data from the commercial provider has direct CVE mentions.

Common platform enumeration (CPE) is a list of software/hardware products that are vulnerable for a given CVE. NIST makes this data available for each vulnerability in its database. Identifying at-risk systems in terms of their components is an important step towards predicting if those systems will be targeted by threat actors (in cases where the hacker discussion is not associated with a CVE number). For the system components under consideration, there exists a hierarchy starting from the platform to vendor to product. For instance, if considering operating systems, then there are limited numbers of vendors that provide it: Microsoft, Apple, Google, etc. If Microsoft is identified as the vendor, then the products are related to the Windows operating system. This hierarchy helps to narrow down possible choices while descending the hierarchy.

System Overview. The knowledge base used in the present disclosure may consist of hacker discussions from darkweb (D2web) forums and marketplaces. This data may be maintained and made available through Application Programming Interfaces (API's) by a commercial darkweb threat intelligence provider. Hacker discussions in terms of posted content from forums and item descriptions from markets, the website the discussion is posted on, and the user posting the discussion may be used as inputs to both the argumentation and machine learning models. The CPE hierarchy from NVD may be used as an input to the argumentation model. In one example of an application of the risk identification system, the dataset is sorted by time (depending on when the discussion was posted); the first 80% is reserved for training (knowledge base) and the remaining 20% for testing. A similar time split is followed to compute the CPE hierarchy as well.

An argumentation model constructs arguments for a given query (at-risk system component) using elements in the knowledge base. A formalism may be used called DeLP that combines logic programming with defeasible argumentation. DeLP is made up of three constructs: facts: observations from the knowledge base that cannot be contradicted; strict rules: logical combinations of facts that are always true; and defeasible rules: can be thought of as strict rules but are only true if no contradictory evidence is present. Arguments help reduce the set of possible choices for platforms, vendors and products; this reduced set of possible system components acts as one of the inputs to the machine learning model. The argumentation model thus constrains the machine learning model to identify the system from the reduced set of possible platforms, vendors, and products.

The machine learning model takes the knowledge base and query as input, along with the reduced set of possible system components from the argumentation model, and provides a result identifying the system. It is constrained by the argumentation model to select the components from the reduced platform, vendor and product set, which aids the machine learning model, thus improving precision. Text-based features extracted from the discussions (TE-IDF/Doc2Vec) may be used for the machine learning model. Any standard machine learning model may be employed by the risk identification system.

Dataset

D2web Data

Figure 2:
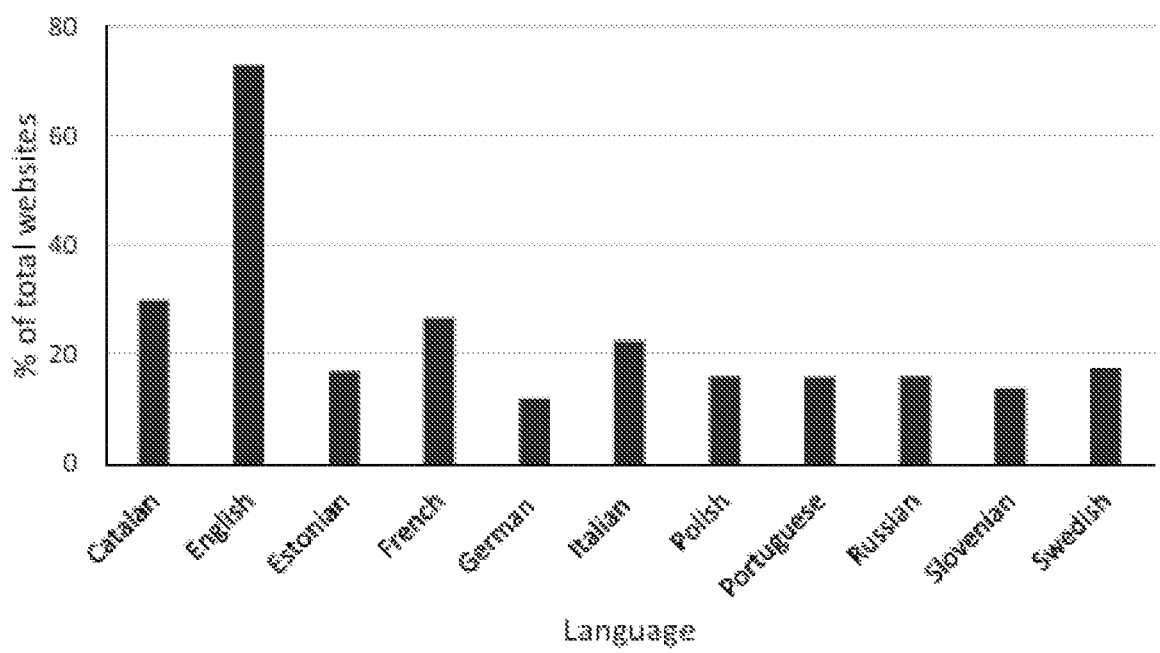
FIG. 2 is a graphical representation showing the percentage of total websites belonging to the top ten languages in the D2web data, according to aspects of the present disclosure.

In an implantation of the risk identification system, D2web data supplied by a threat intelligence company may be used. The data may be accessed via APIs. The data may be comprised of forum discussions and marketplace items offered for sale in D2web. The data may be collected periodically to obtain time-based information indicating changes in the forums and marketplaces. To ensure collection of cyber-security relevant data, machine learning models may be employed that filter the data related to drugs, weapons, and other irrelevant discussions. Table 2 shows the characteristics for the websites, posts/items, and users. The data may be comprised from websites with different languages. A single website might have discussions in different languages. FIG. 2 shows the percentage of total websites from the D2web for the top ten languages used to post discussions Majority of the websites have discussions in English (73%), with other languages having an even distribution. The commercial data collection platform automatically identifies the language and translates it to English using the Google Translate API.

In order to evaluate the performance of the reasoning framework, ground truth associated with the hacker discussions should be established. To obtain ground truth discussions from forums and marketplaces that mention a CVE number are considered. From the CVE number, the vulnerable systems can be looked up using the NVD. It should be noted that for both training and testing the CVE number is removed while computing features. Table 2 shows the characteristics for the websites, posts/items, and users that mention a CVE number. The hacker discussion with CVE mentions belong to 135 websites posted by 3361 users. On analyzing the CVE mentions most of the older vulnerabilities target products that are no longer in use. For that reason in the following experiments, CVE discussions posted after 2013 (starting Jan. 1, 2014) are considered. These discussions make up around 70% of the total CVE discussions.

TABLE 2

| Characteristics of D2web data | |
|---|---:|
| Number of D2web websites | 302 |
| Number of unique users | 635,163 |
| Number of unique posts/items | 6,277,638 |
| Number of D2web websites (CVE mentions) | 135 |
| Number of unique users (CVE mentions) | 3,361 |
| Number of unique posts/items (CVE mentions) | 25,145 |

Figure 3:
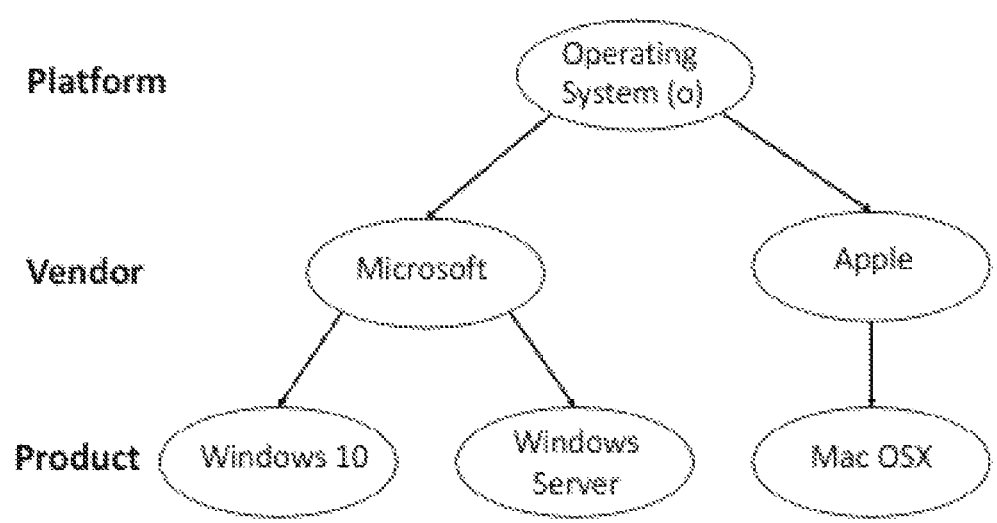
FIG. 3 is a diagram of the subsets of CPE Hierarchy, according to aspects of the present disclosure.

The hierarchy for all the vulnerable systems from all the vulnerabilities disclosed in NVD is computed and maintained as a dictionary from which to build arguments. FIG. 3 shows a subset of the built hierarchy with the three system components: platform, vendor, and product.

A list of system components discussed for each website and user is computed and maintained. This list may be used to indicate if a particular website is preferred by hackers to discuss specific at-risk systems. The user list provides the preference of the user regarding what at-risk systems are of interest to him/her.

Overall in the dataset for platforms most discussions pose a threat to operating systems (57%), followed by applications (43%) and hardware makes up a small fraction of the discussions (3%). There are discussions that pose a risk to multiple platforms i.e. operating systems and application or in few instances all three. For vendors the top five at-risk based on CVE mentions in the hacker discussions are Microsoft (24%), Linux (9%), Apple (6%), Oracle (5%), and Adobe (5%). Similar to platforms, discussions can pose a risk to multiple vendors. For products the distribution is more even since a single vendor can have multiple products. Even though Microsoft dominates the vendor discussion, it also has the most number of products that are at risk. The top five at-risk products based on CVE mentions in the hacker discussions are Windows server (5%), Windows 8.1 (4%), Linux kernel (3.8%), Mac OSX (2.3%), and Flash player (1.9%).

Argumentation Model

The risk identification system may utilize a model of the world where competing hypotheses can be analyzed. Such a model allows for contradictory information so that it can handle inconsistency in the data similar to the one employed for attributing cyber-attacks to responsible threat actors.

In this model, variables and constant symbols represent items such as the platform/vendor/product at-risk by the discussion and post/webID/userID represent the hacker discussion, where it was posted and who posted it respectively. It should be noted that for privacy concerns the webID/userID is represented as an integer in the data provided by the APIs—the names are not disclosed. The set of all variable symbols are denoted with V and the set of all constants are denoted with C. For this model six subsets of C are used:

$C_{post}$ denoting the hacker discussion,
$C_{web}$, denoting the websites (both forums and marketplaces) where the hacker discussion was posted,
$C_{user}$, denoting the users who posts hacker discussions, and
$C_{platform}$, $C_{vendor}$, $C_{product}$ denoting the three components at-risk by the discussion (see Table I).

Symbols are used in all capital letters to denote variables. In the running example, a subset of the D2web dataset collected by a threat intelligence company is used.

Example 1. the Following System and Post/Web/User Information Will be Used in the Running Example $C_{post} = \{post_1, post_2, \ldots, post_n\}$
$C_{web} = \{webID_1, webID_2, \ldots, webID_n\}$
$C_{user} = \{userID_1, userID_2, \ldots, userID_n\}$
$C_{platform} = \{h, o, a\}$
$C_{vendor} = \{microsoft, google, the\_mozilla\_foundation\}$
$C_{product} = \{internet\_explorer, windows\_10, adobe\_reader\}$ ■

A ground atom is composed by a predicate symbol and a tuple of constants, one for each argument—hence, ground atoms have no variables. The set of all ground atoms is denoted with G. A ground literal L is either a ground atom or a negated ground atom. An example of a ground atom for the running example is posted($post_1$, $webID_1$). In the following, G' will be used to denote a subset of G.

In order to be able to deal with conflicting information and offer explainable results, a structured argumentation framework is chosen for the model; this approach works by creating arguments (in the form of a set of rules and facts) that compete with each other to identify at-risk system given a hacker discussion on D2web. In this case, arguments are defeated based on the evaluation of contradicting information in other arguments. This procedure is commonly known as a dialectical process since it follows the same structure as dialogues between humans—as such, arguments that are undefeated (or warranted, in DeLP) prevail. Structuring the analysis in this manner also allows for the leveraging of the resulting structure, since the set of all prevailing arguments give a clear map of how the conclusion is supported by the available data.

A clear benefit of the transparency afforded by such a process is that it lets a human security analyst not only add new arguments based on new evidence, but also eliminates information identified as incorrect (perhaps because it is out of date, or because it comes from a source newly identified as untrustworthy) and fine-tune the model for better performance. Since the argumentation model can deal with inconsistent information, it draws a natural analogy to the way humans settle disputes when there is disagreement. Having a clear explanation of why one argument is chosen over others is a desirable characteristic for both the analyst and for organizations to make decisions and policy changes.

Defeasible Logic Programming

Defeasible Logic Programming (DeLP) is a formalism that combines logic programming with defeasible argumentation. The formalism is made up of several constructs, namely facts, strict rules, and defeasible rules. Facts represent statements obtained from evidence, and are therefore always considered to be true; similarly, strict rules are logical combinations of elements (facts or other inferences) that can always be performed. On the contrary, defeasible

TABLE 3

Example predicates and explanation

| Predicate | Explanation |
| --- | --- |
| posted ($post_1$, $webID_1$) | $post_1$ was posted on the website $webID_1$ |
| at_risk ($\mathcal{D}$, V) | Post $\mathcal{D}$ discussed vendor V being at-risk |
| user_preference ($userID_1$, microsoft) | $userID_1$ prefers to post discussions regarding Microsoft systems at-risk. |
| previously_seen ($webID_1$, adobe_flash) | At-risk discussions regarding Adobe Flash are discussed in $webID_1$. |
| parent (microsoft, safari) | Vendor Microsoft is a parent of product Safari |

The language also contains a set of predicate symbols that have constants or variables as arguments, and denote events that can be either true or false. The set of predicates is denoted with P; examples of predicates are shown in Table 3. For instance, user_preference($userID_1$, microsoft) will either be true or false, and denotes the event where $userID_1$ prefers to post discussions regarding microsoft systems at-risk.

rules can be thought of as strict rules that may be true in some situations, but could be false if certain contradictory evidence is presented. These three constructs are used to build arguments, and DeLP programs are simply sets of facts, strict rules and defeasible rules. The usual notation for DeLP programs is adopted, denoting the program (or knowledge base) with $\|=(\Theta, \Omega, \Delta)$, where $\Theta$ is the set of facts, $\Omega$ is the set of strict rules, and $\Delta$ is the set of defeasible rules.

Examples of the three constructs are provided with respect to the dataset in FIG. 4. Below, the notation used to denote these constructs is described.

Facts ($\Theta$) are ground literals that represent atomic information or its (strong) negation ( ).

Strict Rules ($\Omega$) represent cause and effect information; they are of the form $L_0 \leftarrow L_1, \ldots L_n$, where $L_0$ is a literal and $\{L_i\}_{i>0}$ is a set of literals.

Defeasible Rules ($\Delta$) are weaker versions of strict rules, and are of the form $L_0 \prec L_1, \ldots, L_n$, where $L_0$ is the literal and $\{L_i\}_{i>0}$ is a set of literals.

When a hacker discussion happens on D2web, the model can be used to derive arguments to determine the at-risk system (in terms of platform, vendor, and product). Derivation follows the same mechanism as classical logic programming; the main difference is that DeLP incorporates defeasible argumentation, which decides which arguments are warranted, which arguments are defeated, and which arguments should be considered to be blocked—the latter are arguments that are involved in a conflict for which a winner cannot be determined.

FIG. 4 shows a ground argumentation framework demonstrating constructs derived from the D2web data. For instance, $\theta_1$ indicates the fact that a hacker discussion $post_1$ was posted on the D2web website $webID_1$, and $\theta_5$ indicates that user $userID_1$ prefers to post discussions regarding apple products. For the strict rules, $\omega_1$ says that for a given post $post_1$ posing a threat to operating system (o), the vendor sandisk cannot be at risk if the parent of sandisk is not operating system (o). Defeasible rules can be read similarly; $\delta_2$ indicates that if $post_1$ poses a threat to the vendor apple, the product safari can be at-risk if apple is the parent of safari. By replacing the constants with variables in the predicates a non-ground argumentation framework can be derived that can be applied in general.

Definition 1. (Argument) An argument for a literal L is a pair $\langle \mathcal{A}, L \rangle$, where $\mathcal{A} \subseteq \Pi$ provides a minimal proof for L meeting the requirements: (1) L is defeasibly derived from $\mathcal{A}^1$, (2) $\Theta \cup \Omega \cup \Delta$ is not contradictory, and (3) $\mathcal{A}$ is a minimal subset of $\Delta$ satisfying 1 and 2, denoted $\langle \mathcal{A}, L \rangle$.

[1] This means that there exists a derivation consisting of a sequence of rules that ends in L—that possibly includes defeasible rules.

Literal L is called the conclusion supported by the argument, and $\mathcal{A}$ is the support. An argument $\langle \mathcal{B}, L \rangle$ is a subargument of $\langle \mathcal{A}, L' \rangle$ if $\mathcal{B} \subseteq \mathcal{A}$. The following examples discuss arguments for this scenario.

Example 2. FIG. 5 Shows Example Arguments Based on the KB From FIG. 4; Here, $\langle \mathcal{A}_3, \text{at\_risk}(post_1, \text{apple}) \rangle$ is a Subargument of $\langle \mathcal{A}_2, \text{at\_risk}(post_1, \text{safari}) \rangle$ For a given argument there may be counter-arguments that contradict it. A proper defeater of an argument $\langle \mathcal{A}, D \rangle$ is a counter-argument that—by some criterion—is considered to be better than $\langle \mathcal{A}, L \rangle$; if the two are incomparable according to this criterion, the counterargument is said to be a blocking defeater. The default criterion used in DeLP for argument comparison is generalized specificity, but any domain-specific criterion (or set of criteria) can be devised and deployed.

A sequence of arguments is called an argumentation line. There can be more than one defeater argument, which leads to a tree structure that is built from the set of all argumentation lines rooted in the initial argument. In this dialectical tree, every child can defeat its parent (except for the root), and the leaves represent unchallenged arguments; this creates a map of all possible argumentation lines that can be used to decide whether or not an argument is defeated. Arguments that either have no attackers or all attackers have been defeated are said to be warranted.

Given a literal L and an argument $\langle \mathcal{A}, L \rangle$, in order to decide whether or not a literal L is warranted, every node in the dialectical tree $\mathcal{T}(\langle \mathcal{A}, L \rangle)$ is recursively marked as "D" (defeated) or "U" (undefeated), obtaining a marked dialectical tree $\mathcal{T}^*(\langle \mathcal{A}, L \rangle)$ where:

All leaves in $\mathcal{T}^*(\langle \mathcal{A}, L \rangle)$ are marked as "U"s, and Let $\langle \mathcal{B}, q \rangle$ be an inner node of $\mathcal{T}^*(\langle \mathcal{A}, L \rangle)$. Then, $\langle \mathcal{B}, q \rangle$ will be marked as "U" if every child of $\langle \mathcal{B}, g \rangle$ is marked as "D". Node $\langle \mathcal{B}, q \rangle$ will be marked as "D" if it has at least one child marked as "U".

Given argument $\langle \mathcal{A}, L \rangle$ over $\|$, if the root of $\mathcal{T}^*(\langle \mathcal{A}, L \rangle)$ is marked "U", then $\mathcal{T}^*(\langle \mathcal{A}, h \rangle)$ warrants L and that L is warranted from H. It is interesting to note that warranted arguments correspond to those in the grounded extension of a Dung abstract argumentation system.

An implemented DeLP system therefore takes as inputs a set of facts, strict rules, and defeasible rules, as well as a query literal. Note that while the set of facts and strict rules must be consistent (non-contradictory), the set of defeasible rules can be inconsistent—the presence of such inconsistency is the root of "interesting" cases. The risk assessment system framework may be engineered as a set of defeasible and strict rules whose structure was created manually, but are dependent on values learned from a historical corpus of D2web data. Then, for a given post discussing a vulnerability, a set of facts is instantiated for that situation; this information is then provided as input into the DeLP system, which uses heuristics to generate all arguments for and against every possible components of the system (platforms, vendors, products) for the post discussion. Dialectical trees based on these arguments are analyzed, and a decision is made regarding which components are warranted. This results in a reduced set of potential choices, which are then used as input into a classifier to obtain the at-risk system. The following section discusses these steps in full detail.

Experiments. The identification of at-risk systems is framed as a multi-label classification problem for each of the system component (platform, vendor, and product)—the basic step involves extracting textual features from the discussions to be used as input to the machine learning models.

Data Representation

As mentioned above, text-based features are used to represent the hacker discussions on the D2web, which are then used as input to the machine learning models. Some of the discussions may be in foreign languages. The commercial data collection platform automatically identifies the language and translates it to English using the Google Translate API. The following pre-processing steps are taken to address different challenges. Two feature engineering techniques are employed, namely TF-IDF and Doc2Vec.

Text cleaning is performed by removing all non-alphanumeric characters from hacker discussions. This removes any special characters that do not contribute towards making the decision.

Misspellings and word variations are frequently observed in the discussions on the D2web, leading to separate features in the feature vector if a standard bag-of-words (BOW) approach is used. In BOW, a dictionary is created of all the word occurrences in the training set; then, for a particular discussion, the feature vector is created by looking up which words have occurred and their count in the discussion. Misspellings and word variations will thus be represented as different words; to address this, character n-gram features are used. As an example, consider the word "execute"—if tri-gram character features were being used, the word "execute" would yield the set of features:

{"exe", "xec", "ecu", "cut", "ute"}.

The benefit of this technique is that the variations or misspellings of the word, such as "execution", "executable", or "execute", will all have common features. It has been found that using character n-grams in the range 3-7 worked best in some experiments.

The n-gram features are vectorized using the term frequency-inverse document frequency (TF-IDF) model, which creates a vocabulary of all the n-grams in the discussion. In TF-IDF, the importance of an n-gram feature increases with the number of times it occurs, but is normalized by the total number of n-grams in the description. This eliminates common words from being important features. The top 1,000 most frequent features are considered.

Doc2Vec is a feature engineering technique used to generate document vector, which acts as input to the classifier to identify at-risk systems. In this context, "document" refers to a discussion In Doc2Vec, first, a vector representation of each word in the document in computed by taking into account the words around it (to maintain context) and then these word vectors are averaged to get a representation of the document. Doc2Vec may be implemented using the gensim library in Python.

Supervised Learning Approaches

The experiments have been conducted using the following standard machine learning approaches implemented using a Python machine learning library.

Support Vector Machine (SVM). Support vector machines (SVM) work by finding a separating margin that maximizes the geometric distance between classes (in this context, different platforms, vendors, and products). Given the geometric interpretation of the data, the separating margin is referred to as a hyperplane.

Random Forest (RF). Ensemble methods are popular classification tools. They are based on the idea of generating multiple predictors used in combination to classify new unseen samples. In this context a random forest is used that combines bagging for each tree with random feature selection at each node to split the data, thus generating multiple decision tree classifiers. Each decision tree gives its own opinion on test sample classification, which is then merged to make a final decision.

Naive Bayes Classifier (NB). NB is a probabilistic classifier that uses Bayes' theorem under the assumption of independent features. During training, the conditional probabilities of a sample of a given class having a certain feature are computed. The prior probabilities for each class, i.e., the fraction of the training data belonging to each class, are also computed. Since Naive Bayes assumes that the features are statistically independent, the likelihood for a sample $S$ represented with a set of features a associated with a class c is given by:

$$Pr(c \mid S) = Pr(c) \times \prod_{i=1}^{d} Pr(a_i \mid c).$$

Decision Tree (DT). This is a hierarchical recursive partitioning algorithm. The decision tree is built by finding the best split feature, i.e., the feature that maximizes the information gain at each split of a node.

Logistic Regression (LOG-REG). Logistic regression classifies samples by computing the odds ratio, which gives the strength of association between the features and the class.

Evaluation Metrics

In these experiments, performance is evaluated based on three metrics: precision, recall, and F1 measure. For a given hacker discussion, precision is the fraction of labels (platforms, vendors, or products) that the model associated with the discussion that were actual labels in the ground truth. Recall, on the other hand, is the fraction of ground truth labels identified by the model. The FI measure is the harmonic mean of precision and recall. In the results, the average precision, recall, and FI are reported for all the test discussions.

TABLE 4

Average Precision, Recall, and F1 measure for NB, LOG-REG, DT, RF and SVM to identify at-risk systems.

| Component | Model | Precision | Recall | F1 measure |
|---|---|---|---|---|
| Platform | NB | 0.68 | 0.65 | 0.66 |
| | LOG-REG | 0.72 | 0.76 | 0.74 |
| | DT | 0.66 | 0.70 | 0.68 |
| | RF | 0.70 | 0.75 | 0.72 |
| | SVM | 0.72 | 0.78 | 0.76 |
| Vendor | NB | 0.37 | 0.34 | 0.36 |
| | LOG-REG | 0.28 | 0.25 | 0.27 |
| | DT | 0.39 | 0.43 | 0.41 |
| | RF | 0.40 | 0.43 | 0.41 |
| | SVM | 0.40 | 0.48 | 0.44 |
| Product | NB | 0.19 | 0.14 | 0.16 |
| | LOG-REG | 0.20 | 0.13 | 0.16 |
| | DT | 0.22 | 0.15 | 0.18 |
| | RF | 0.22 | 0.25 | 0.24 |
| | SVM | 0.26 | 0.24 | 0.25 |

Baseline Model (BM)

For the baseline model, the machine learning technique is leveraged to identify the at-risk systems. Training and testing sets are created by sorting the discussions by posted time on the website in order to avoid temporal intermixing. The first 80% of the samples are reserved for training and the rest (20%) for testing. Both TF-IDF and Doc2Vec are employed as feature engineering techniques. On conducting the experiments, it was observed that TF-IDF performed better than Doc2Vec in all the experiments. Hence only the results using TF-IDF features are reported.

Results

Table 4 shows the average performance of the machine learning technique for each component of the at-risk system. For platform identification, SVM performs the best with the following averages:

precision: 0.72,
recall: 0.78, and
F1 measure: 0.76.

LOG-REG had similar precision, but lower recall. Similarly, for vendor identification, SVM performs the best with averages:

precision: 0.40,
recall: 0.48, and
FI measure: 0.44,
with RF having similar precision. For platform identification, SVM had the best performance:
precision: 0.28,
recall: 0.24 (comparable to RF), and
F1 measure: 0.25.

Since SVM performs consistently better for all three classification problems, moving forward SVM is used as the machine learning component in the reasoning framework (cf. FIG. 1).

Reasoning Framework (RFrame)

Descending the CPE hierarchy, the number of possible labels for vendors and products increases largely as the number of discussions representing each label decreases, thus making learning difficult and decreasing performance. This issue is addressed by proposing a set of strict and defeasible rules for platform, vendor, and product identification. It should be noted that these rules arise from the discussion that is being evaluated and do not require parameter learning.

The notation described in Table 5 may be used for defining the constructs (facts, strict rules, and defeasible rules). It should be noted that facts cannot have variables, only constants (however, to compress the program for presentation purposes, meta-variables can be used in facts). To begin, the facts are defined (see FIG. 6): $\theta_1$ states that a hacker discussion $\mathcal{D}$ was posted on the D2web website $\mathcal{W}$ (can be either forum or marketplace), and $\theta_2$ states that the user $\mathcal{U}$ posted the discussion. For each level in the CPE hierarchy, additional rules are defined and discussed as follows.

Platform Model. The first level of system identification is identifying the platform that the hacker discussion is a threat to. Previously discussed platforms on D2web websites under consideration were computed. Similarly, which platform the user under consideration prefers (based on their previous postings) is also computed. This shows preferred platform discussions on websites and by users, which can aid the machine learning model in reducing the number of platforms it can identify from. The DeLP components that model platform identification are shown in FIG. 7. For the defeasible rules, $\delta_1$ indicates that all the platforms $\mathcal{S}_w$ previously seen in the D2web website $\mathcal{W}$ where the current discussion $\mathcal{D}$ is observed are likely at-risk, $\delta_2$ indicates that all the platforms $\mathcal{S}_u$ from user $\mathcal{U}$'s previous postings are also likely at-risk.

Vendor Model. The second level is identifying the at-risk vendor. For this case, the platform result from the previous model may be used, taking that as a DeLP fact. The DeLP components that model vendor identification are shown in FIG. 8. Here, the fact $\theta_1$ indicates the platform identified for the discussion—note that multiple platforms may be identified based on the discussion. The strict rule $\omega_1$ states that for a given post $\mathcal{D}$ posing a threat to platform s, the vendor $v_i$ cannot be at-risk if the parent of $v_i$ is not the identified platform s. This rule is based on the CPE hierarchy obtained from NVD. For the defeasible rules, $\delta_1$ indicates that all the vendors $V_w$, previously seen in the D2web website $\mathcal{W}$ where the current hacker discussion $\mathcal{D}$ is observed are likely at-risk, $\delta_2$ indicates that all the vendors $V_u$ from user $\mathcal{U}$'s previous postings are also likely at-risk, and $\delta_3$ states that for a given post $\mathcal{D}$ posing a threat to platform s, all the vendors whose parent is the identified platform are likely at-risk. This rule is also based on the CPE hierarchy from NVD.

TABLE 5

Notation and Explanations

| Notation | Explanation |
| --- | --- |
| $\mathcal{D}$ | The hacker discussion (posted on website) under consideration. |
| $\mathcal{W}$ | Website (marketplace or forum) where the hacker discussion was posted. |
| $S_w, V_w$ and $\mathcal{P}_w$ | The set of platforms, vendors and products at-risk by the hacker discussions previously seen in $\mathcal{W}$ under consideration respectively. |
| $\mathcal{U}$ | User posting the hacker discussion. |
| $S_u, V_u$ and $\mathcal{P}_u$ | The set of platforms, vendors and products at-risk by the hacker discussions previously posted by user $\mathcal{U}$ under consideration respectively. |
| $S_p, V_p$ and $\mathcal{P}_p$ | The set of platforms, vendors and products identified by the machine learning model at each level in the hierarchy for hacker discussions under consideration respectively. |
| $s_i, v_i$ and $p_i$ | Each element of the set $S_p, V_p$ and $\mathcal{P}_p$ representing a single platform, vendor or product respectively. |

Product Model. The third level is identifying the at-risk product. For this case, the vendor result from the previous model may be used; as before, this is used as a DeLP fact. The DeLP components that model product identification are shown in FIG. 9. Here, the fact $\theta_1$ indicates the vendor identified for the discussion—again, multiple vendors may be identified based on the discussion. The strict rule $\omega_1$ states that for a given post $\mathcal{D}$ posing a threat to vendor v, the product $p_i$ cannot be at-risk if the parent of $p_i$ is not the identified vendor v. (again, based on the CPE hierarchy). For the defeasible rules, $\delta_1$ indicates that all the products $\mathcal{P}_w$ previously seen in the D2web website $\mathcal{W}$ where the current hacker discussion $\mathcal{D}$ is observed are likely at-risk, $\delta_2$ indicates that all the products $\mathcal{P}_u$ from user $\mathcal{U}$'s previous postings are also likely at-risk, and $\delta_3$ states that for a given post $\mathcal{D}$ posing a threat to vendor v, all the products whose parent (in the CPE hierarchy) is the identified vendor are likely at-risk.

Results

The reasoning framework is evaluated using an experimental setup similar to the one discussed in the baseline model. The precision, recall, and F1 measure for each of the system components are reported and compared to the best performing baseline model (BM). Table 6 shows the comparison between the two models.

For platform identification, RFrame outperforms BM in terms of precision: 0.83 vs. 0.72 (a 15.27% improvement), while maintaining the same recall. Similarly, for vendor and product identification there was significant improvement in precision: 0.56 vs. 0.40 (a 40% improvement) and 0.41 vs. 0.26 (a 57.69% improvement), respectively, with comparable recall with respect to the baseline model. The major reason for the jump in precision is the reduction of possible labels based on the arguments introduced that aids the machine learning model to make the correct decision.

TABLE 6

Average Precision, Recall, and F1 measure comparison between the baseline model (BM) and reasoning framework (RFrame).

| Component | Model | Precision | Recall | F1 measure |
|---|---|---|---|---|
| Platform | BM | 0.72 | 0.78 | 0.76 |
| | RFrame | 0.83 | 0.78 | 0.80 |
| Vendor | BM | 0.40 | 0.48 | 0.44 |
| | RFrame | 0.56 | 0.44 | 0.50 |
| Product | BM | 0.26 | 0.24 | 0.25 |
| | RFrame | 0.41 | 0.21 | 0.30 |

Discussion

The performance of the reasoning system highlights that the hybrid framework identifies at-risk systems with higher precision with respect to the approach using only machine learning classifiers. In this application, a high precision is desired—while maintaining at least comparable recall—in order to provide high value risk assessment of systems; low precision is often equated to a less reliable framework. The majority of misclassifications are a result of less data representing those systems in the training set; for some system components, the instances can be as low as having only one discussion in the training set. This issue becomes more relevant descending the hierarchy with large numbers of vendors and products. In some test instances, for the same platform and vendor, a new product not previously known to be at-risk becomes vulnerable due to a newly disclosed vulnerability. In this case, the reasoning framework is not able to identify the product since it was not previously observed, and this can contribute to a misclassification.

From a security analyst's perspective, the reasoning framework not only provides a list of possible at-risk systems but also provides arguments indicating why a particular system was identified as being at-risk. This lets the analyst evaluate the decisions made by the framework and fine-tune it if necessary. For cases where a new product (not previously discussed in training) is at-risk, even a partial identification of the system (in terms of platform and vendor) is of value to the analyst. Based on the alert provided by the framework, the analyst can manually evaluate the arguments and the discussions to identify possible products, depending on the platform and vendor identified by the framework.

Figure 10:
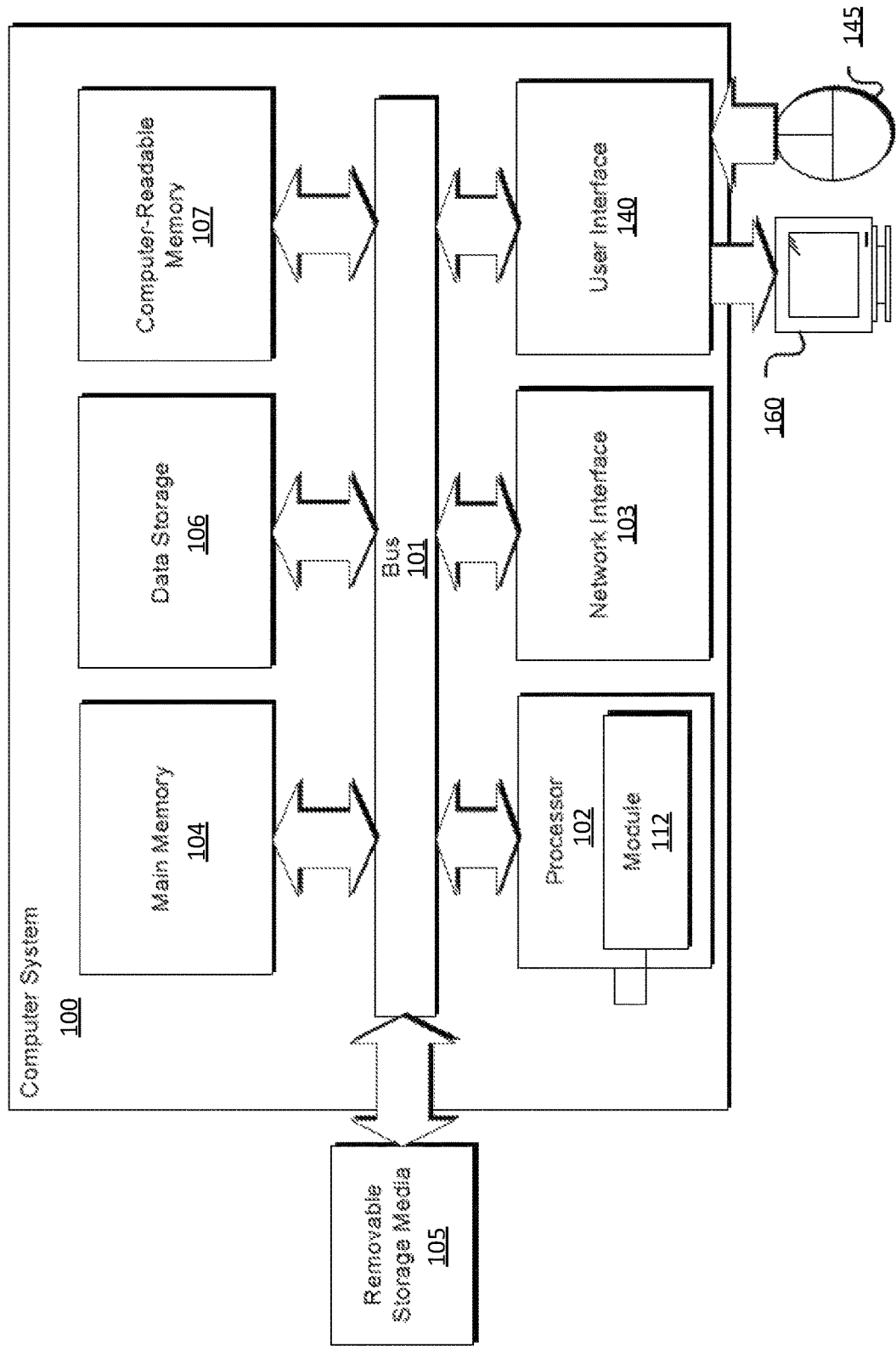
FIG. 10 is a simplified block diagram of a representative computing system that may employ a risk identification system, according to aspects of the present disclosure.

Referring to FIG. 10 an example of a suitable computing system 100 used to implement various aspects of the present system and methods for at-risk system identification is shown. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

As illustrated, the computing system 100 may be a general purpose computing device, although it is contemplated that the computing system 100 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 102, a main memory 104 (e.g., a system memory), and a system bus 101 that couples various system components of the general purpose computing device to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 100 may further include a variety of computer-readable media 107 that includes removable/non-removable media and volatile/nonvolatile media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. For example, in one embodiment, data storage 106 holds an operating system, application programs, and other program modules and program data.

Data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 or other input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 145 are often connected to the processor 102 through a user interface 140 that is coupled to the system bus 101, but may be connected by other interface and bus structures, such as a parallel port, game port or a universal serial bus (USB). A monitor 160 or other type of display device is also connected to the system bus 101 via user interface 140, such as a video interface. The monitor 160 may also be integrated with a touch-screen panel or the like.

The general purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

Figure 11:
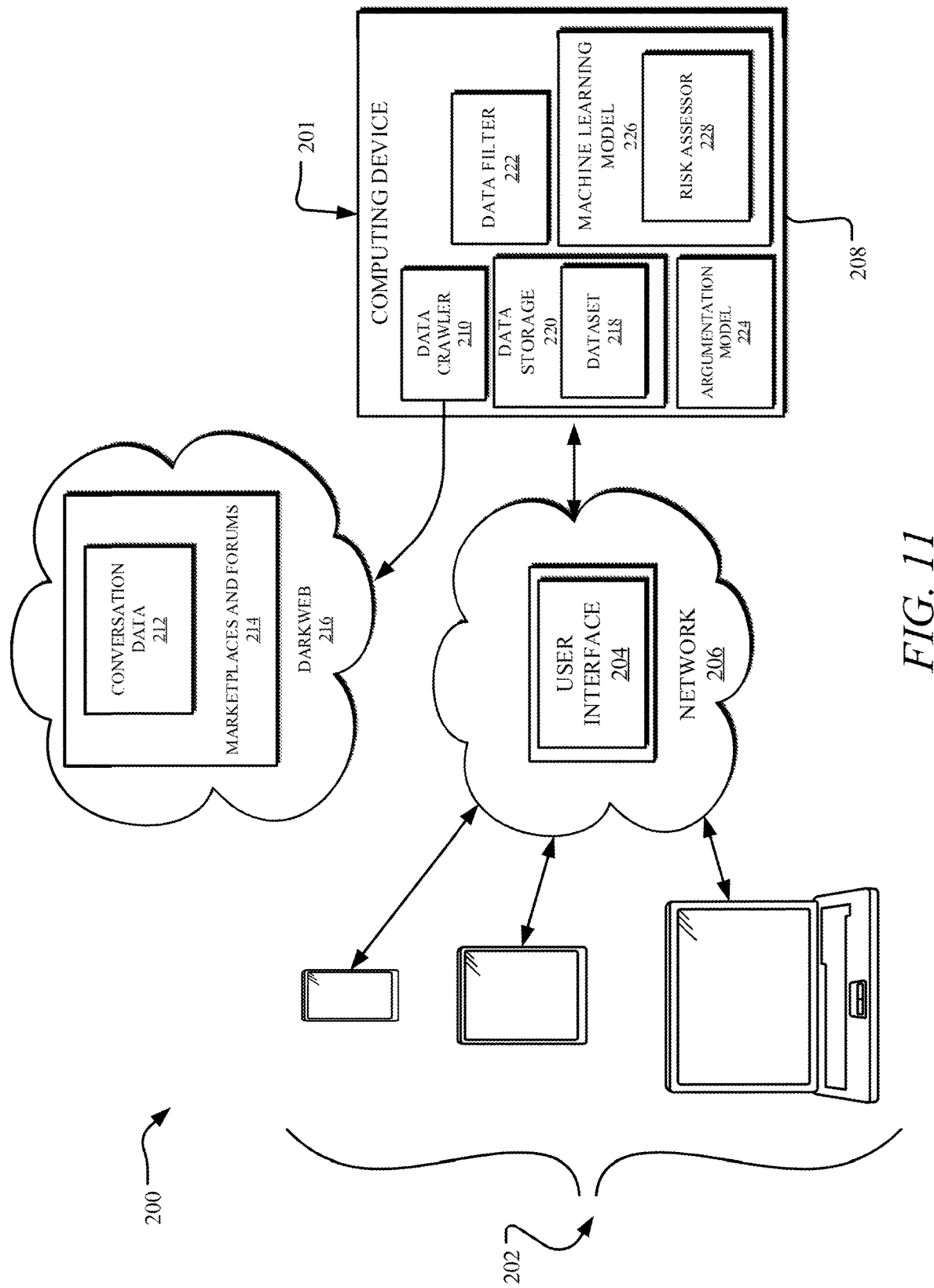
FIG. 11 is a simplified network diagram illustrating a computing network that may employ the risk identification system, according to aspects of the present disclosure.

FIG. 11 is a network/system diagram 200 for illustrating a computing network that may be configured to implement a risk identification system 201. The risk identification system 201 may be generally comprised of one or more computing devices configured with aspects of the machine learning models and argumentation models described herein. In other words, the aforementioned computations for identifying at risk systems can be translated to computing code and installed to one or more computing devices, thereby configuring such computing devices with functionality for identifying at-risk systems by, e.g., accessing system data, and applying the system data to an argumentation model and machine learning model to generate a risk assessment.

In some embodiments, the network environment of the risk identification system 201 may include a plurality of user devices 202. The user devices 202 may access a user interface 204 which may generally embodies features of the risk identification system 201 and makes at least some of the features accessible to the user devices 202 via a network 206. The user devices 202 may be generally any form of computing device capable of interacting with the network 206 to access the application 204 and implement the risk identification system, such as a mobile device, a personal computer, a laptop, a tablet, a work station, a smartphone, or other internet-communicable device. In some embodiments, the features made available to a user by the user interface 204 are executed and generally managed by a computing device 208 such as a server, or Saas (Software as a service) provider in a cloud. In some embodiments, the computing device 208 may comprise a data crawler 210 configured to access conversation data 212 from marketplaces and forums 214 hosted on the darkweb 216. In other embodiments, the conversation data 212 may be provided by a data supplier. The conversation data 212 may then be stored as a dataset 218 in a data storage 220 feature hosted on the computing device 208. The dataset 218 may then be filtered by a data filter 222 configured to filter data according to predetermined criteria. The filtered data may then be fed into an argumentation model 224 configured to generate arguments based on the filtered data and predetermined conditions. A machine learning model 226 may then be employed to take as input the generated arguments and filtered data, then generate as output a value for risk using a risk assessor 228.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for computer-implemented identification of at-risk systems, comprising:
a processor in communication with a tangible storage medium storing instructions that are executed by the processor such that the processor:
accesses input data including a hacker discussion discussing a vulnerability;
constructs arguments for a given query associated with a set of at-risk system components using elements in a predetermined knowledge base, the arguments for and against each of the set of components of a system being of risk to exploitation based on a hacker communication to constrain the set of components to a reduced set of components; and
executes a machine learning model trained to use as input the reduced set of components and the query to identify a system associated with the reduced set of components that is susceptible to the vulnerability and at risk to a cyber-attack, identification of the system being prior to the cyber-attack occurring.

2. The system of claim 1, wherein the set of system components includes possible platform components, vendor components, and product components susceptible to the vulnerability and at risk of exploitation.

3. The system of claim 1, wherein the hacker discussion is derived from discussion data retrieved from darkweb based marketplaces and forums.

4. The system of claim 1, wherein the input data is sorted according to time.

5. The system of claim 1, wherein the processor executes the machine learning model to implement machine learning techniques with defeasible argumentation to reduce a set of possible labels for each of the set of system components.

6. The system of claim 1, wherein the machine learning model is constrained to select a set of components related to the system from a reduced platform, a vendor, and a product set.

7. The system of claim 1, wherein the processor implements an argumentation model configured to construct arguments for a given query that provides arguments supporting decisions indicating why a particular system was identified prior to the cyber-attack from the input data over other systems to support understanding of the identification of the system.

8. The system of claim 1, wherein the machine learning model uses a text-based feature extracted from data associated with the hacker discussion.

* * * * *